(12) United States Patent  (10) Patent No.: US 7,656,977 B2
Singh  (45) Date of Patent: Feb. 2, 2010

(54) METHOD AND SYSTEM OF FREQUENCY DOMAIN EQUALIZATION

(75) Inventor: Prashant Singh, Minneapolis, MN (US)

(73) Assignee: LSI Corporation, Milpitas, CA (US)

( * ) Notice: Subject to any disclaimer, the term of this patent is extended or adjusted under 35 U.S.C. 154(b) by 632 days.

(21) Appl. No.: 11/256,529

(22) Filed: Oct. 21, 2005

(65) Prior Publication Data

US 2007/0091994 A1    Apr. 26, 2007

(51) Int. Cl.
 *H04B 1/10*  (2006.01)
(52) U.S. Cl. .................. 375/350; 375/348; 375/343
(58) Field of Classification Search ........... 375/350, 375/229, 233, 234; 455/323
 See application file for complete search history.

(56) References Cited

U.S. PATENT DOCUMENTS

| 6,437,932 | B1 | 8/2002 | Prater et al. | 360/46 |
| 2003/0022652 | A1* | 1/2003 | Stepp et al. | 455/323 |
| 2003/0174761 | A1* | 9/2003 | Huang et al. | 375/219 |
| 2005/0117489 | A1* | 6/2005 | Serizawa | 369/59.21 |
| 2005/0254567 | A1* | 11/2005 | Sivadas et al. | 375/229 |

OTHER PUBLICATIONS

An Adaptive Analog Noise-Predictive Decision-Feedback Equalizer; Michael Q. Le, Member, IEEE, Paul J. Hurst, Fellow, IEEE, and John P. Keane, Student Member, IEEE; 0018-9200/02$17.00 © 2002 IEEE.
Analog and Mixed-Signal Circuits for Digital Communication; Richard R. Spencer and Paul J. Hurst; Department of Electrical and Computer Engineering, University of California, Davis, CA 95616; Final Report on 1999-00 MICRO Project #99-111; Industrial Sponsors: Level-One Communications, National Semiconductor and Silicon Systems, Inc.
NRZ Timing Recovery Technique for Band-Limited Channels; Bang-Sup Song, Senior Member, IEEE, and David C. Soo; IEEE Journal of Solid-State Circuits, vol. 32, No. 4, Apr. 1997; 0018-9200/97$10.00 © 1997 IEEE.

* cited by examiner

*Primary Examiner*—Chieh M Fan
*Assistant Examiner*—Qutbuddin Ghulamali
(74) *Attorney, Agent, or Firm*—Suiter Swantz pc llo

(57) ABSTRACT

A method and system of frequency domain equalization. In an embodiment, the frequency domain equalizer system includes a transmit driver. A receiver decision circuit is communicatively coupled to the transmit driver. The receiver decision circuit may have an input signal and an output signal. An all-pass filter may be communicatively coupled to the transmit driver and the receiver decision circuit. The all-pass filter having an all-pass input signal which comprises an integration of a summation of the receiver decision circuit input signal and the receiver decision circuit output signal, each signal being acted upon by at least one band-pass filter.

19 Claims, 4 Drawing Sheets

METHOD AND SYSTEM OF FREQUENCY DOMAIN EQUALIZATION

FIELD OF THE INVENTION

The present invention relates generally to the field of signal processing and more particularly to frequency domain equalizers.

BACKGROUND OF THE INVENTION

When transmitting an electrical signal over a backplane, the signal is significantly degraded by losses and reflections. In order to properly recover the signal at the receiver, some form of equalization is necessary to counteract the effects of the channel. A common equalization technique utilized to remove noise and distortion of digital signals, such as intersymbol interference (ISI) caused by attenuation of high frequencies, is decision feedback equalization (DFE).

Typically, DFE is implemented at the receiver and includes placing a finite impulse feedback (FIR) filter at the output of the receiver decision circuit. Many decision feedback equalizers incorporate FIR filters to reduce errors caused by interference between successive pulses of data (e.g., ISI). Often, the input of the FIR filter is the output of the decision circuit, and the output of FIR filter is subtracted from the input of the decision circuit by a summer or summing circuit. An exemplary schematic of conventional DFE used to remove ISI without amplifying high-frequency noise is illustrated in FIG. 1.

Although presently available DFE systems are effective at boosting high frequency signals that are attenuated as the signal passes through the channel without amplifying high-frequency noise, such systems are limited in certain aspects. First, a delay of precisely one bit of time is required in the FIR filter. Synthesizing this exact delay requires tuning, is difficult to achieve with the process variations of semiconductor manufacturing, and requires the circuit to consume a great deal of power. Moreover, a basic premise of a DFE algorithm is that the decision made by the decision circuit is correct whereby such decision is used to form the feedback for the equalization. The need for the decision circuit to be correct is particularly problematic when dealing with heavily distorted channels. For example, when the channel is heavily distorted, the initial decision may not be correct. Under such condition, the weights of the filter coefficients must be accurately chosen before the system is used in order to insure that the decision is correct. However, if the properties of the channel are unknown, then DFE may not be able to adapt to generate the optimal equalization for one may not be able to select proper filter coefficient weights.

Therefore, it would be desirable to provide an equalization system which does not require the synthesis of precise delays and thus, uses minimal power. Further, it would be desirable for such system to be capable of adapting to heavily distorted channels.

SUMMARY OF THE INVENTION

In an aspect of the present invention, a frequency domain equalizer system is provided. In the present aspect, the frequency domain equalizer system includes a transmit driver. A receiver decision circuit is communicatively coupled to the transmit driver. The receiver decision circuit may have an input signal and an output signal. An all-pass filter may be communicatively coupled to the transmit driver and the receiver decision circuit. The all-pass filter may have an all-pass input signal which includes an integration of a summation of the receiver decision circuit input signal and the receiver decision circuit output signal, each signal being acted upon by at least one band-pass filter.

In a further aspect of the present invention, a method for frequency domain equalization using a frequency domain equalizer in a communication system is provided. The method includes transmitting a first data signal by a transmit driver to a receiver decision circuit and a first band-pass filter. The first data signal may be received by the receiver decision circuit and the receiver decision circuit may then transmit a second data signal to a second band-pass filter. The method also includes, integrating a summation of the first data signal and the second data signal. The integrated summation of the first data signal and the second data signal may be transmitted to an all-pass filter. The first data signal and the second data signal may be adjusted so that the difference between the first data signal and the second data signal is approximately zero.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings. It is to be appreciated that corresponding reference numbers refer to generally corresponding structures.

Figure 1:
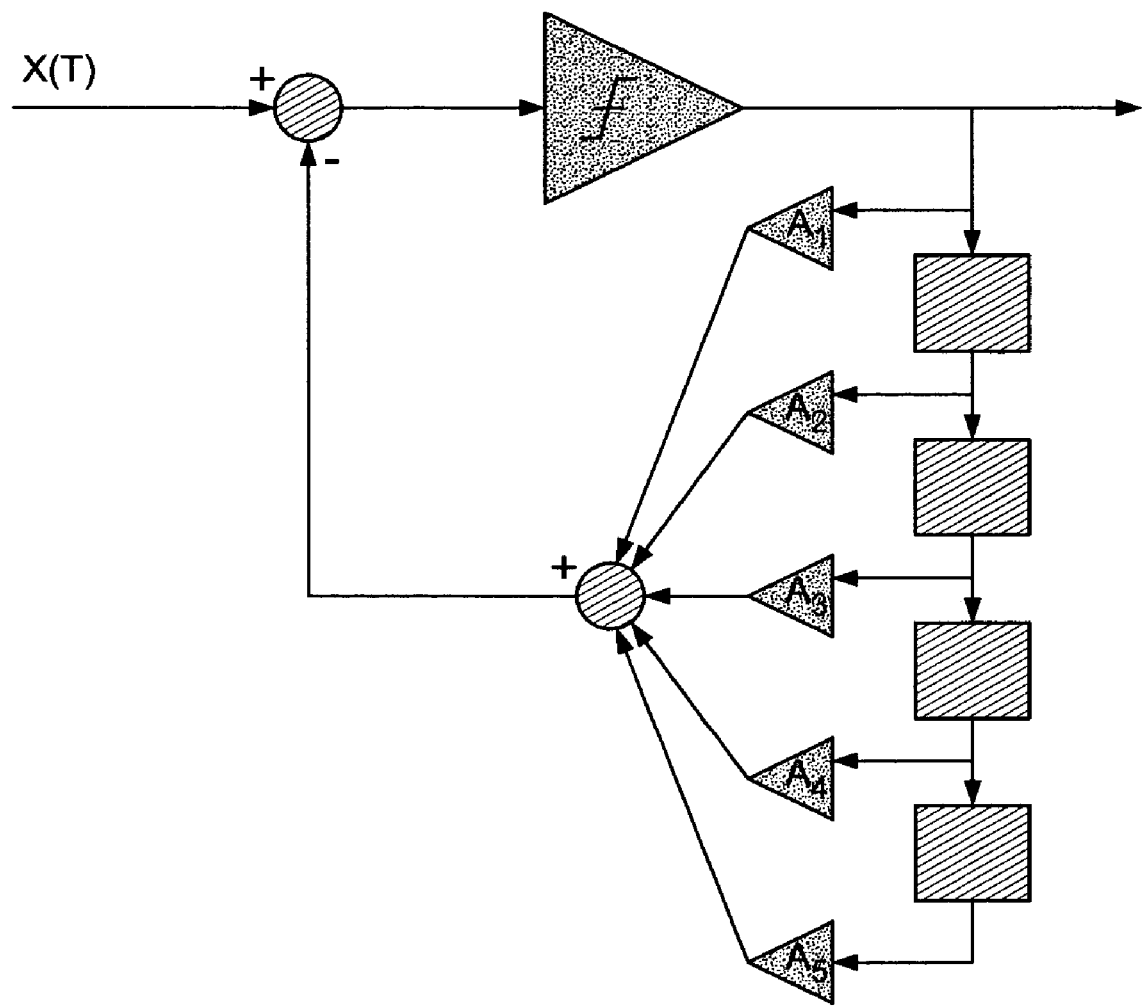
FIG. 1 is a schematic of a prior art decision feedback equalizer.
Figure 2:
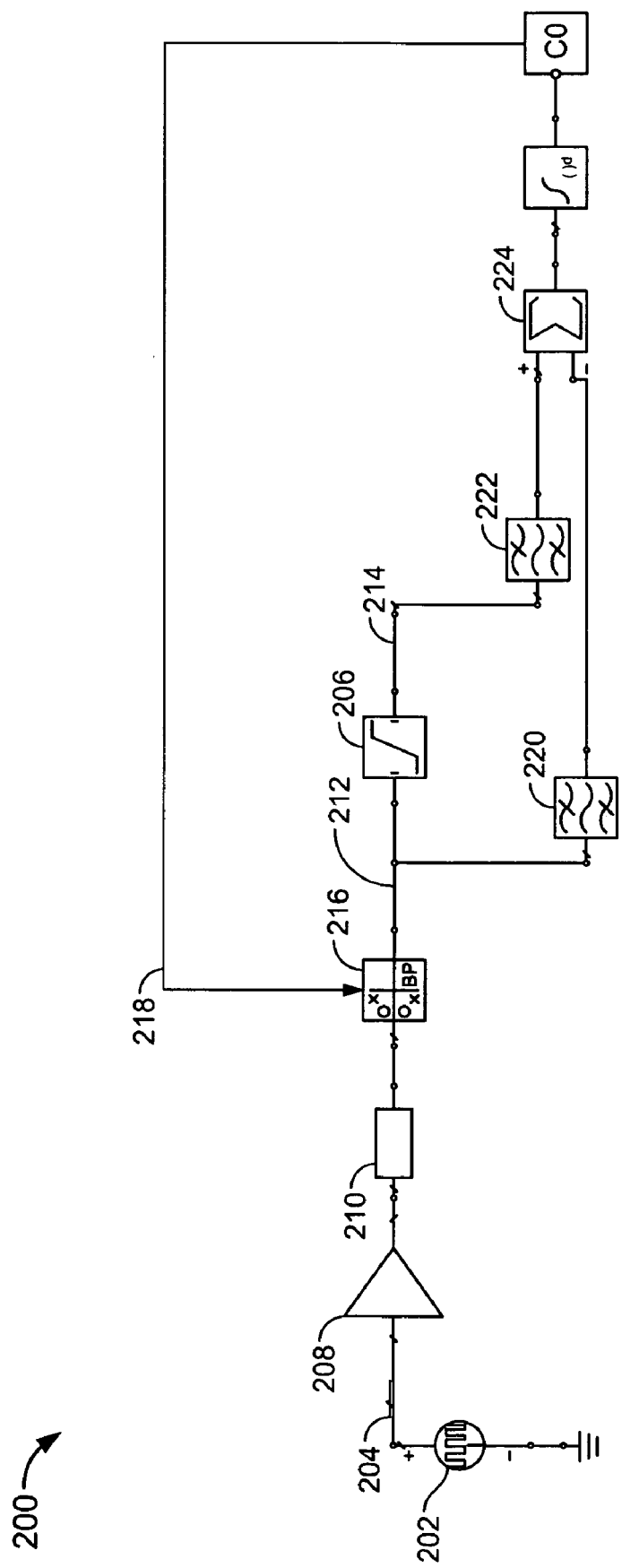
FIG. 2 is a schematic of a frequency domain equalizer system in accordance with an exemplary embodiment of the present invention, wherein the system includes a first band-pass filter, a second band-pass filter, and a summing circuit.

Referring to FIG. 2, a frequency domain equalization system 200 in accordance with an exemplary embodiment of the present invention is provided in which the frequency domain equalizer system 200 includes a transmit driver 202. In the present embodiment, the transmit driver 204 transmits a first data signal 204 to a receiver decision circuit 206. The receiver decision circuit 206 may be communicatively coupled to the transmit driver 204 via an amplifier 208 and a channel 210. The amplifier 208 may amplify the first data signal 204 prior to transmitting the signal 204 to the channel 210. In an exemplary embodiment, the receiver decision circuit may have an input signal 212 and an output signal 214.

In an exemplary embodiment, as illustrated in FIG. 2, an all-pass filter 216 may be communicatively coupled to the transmit driver 202 and the receiver decision circuit 206. For instance, the all-pass filter 306 is a multiple pole/multiple zero all-pass filter. In addition, the all-pass filter 216 may have an all-pass input signal 218 which includes an integration of a summation of the receiver decision circuit input signal 212 and the receiver decision circuit output signal 214, each signal being acted upon by at least one band-pass filter. For example, the receiver decision input signal 212 is acted upon by a first band-pass filter 220 and the receiver decision output signal is acted upon by a second band-pass filter 222. The receiver decision circuit input signal 212 may be compared to the receiver decision circuit output signal 214. In such example, feedback may be employed to adjust the all-pass filter 218 to drive the difference between the receiver decision circuit input signal 212 and the receiver decision circuit output signal 214 is approximately zero.

It is contemplated that the summation process may occur via a summer or a summing circuit 224. It is further contemplated that the first and the second band-pass filters 220, 222 may be Butterworth band-pass filters. The use of band-pass filters allows the feedback signal to be in the frequency domain and thereby, does not require the synthesis of precise time delays as seen in the prior art. Further, the removal of required time delays minimizes the amount of power required for the equalization process.

With continued reference to FIG. 2, the frequency domain equalization system 200 may be configured so that the rise time and the duty cycle of the transmit driver 202 is approximately equivalent to the rise time and the duty cycle of the receiver decision circuit 206. In an embodiment, both signals are completely limited, resulting in the frequency signal spectrum or content prior to the channel 210 denoted as 204 as being approximately equivalent to the frequency signal spectrum or content of the receiver decision circuit output signal 214. Such configuration allows the frequency domain equalizer system 200 to accommodate any channel regardless of data coding whereby the equalizer will adapt to channel variations. Thus, the present system 200 may work with varying data types including, but not limited to, 8b/10b encoded data, 64b/66b encoded data, and Sonnet Data. In addition, the present system does not rely upon a correct decision being made by a receiver decision circuit as is necessary with prior art equalizers in order for the feedback equalization to be successful. As a result, the disclosed equalization system can accommodate heavily distorted channels.

Figure 3:
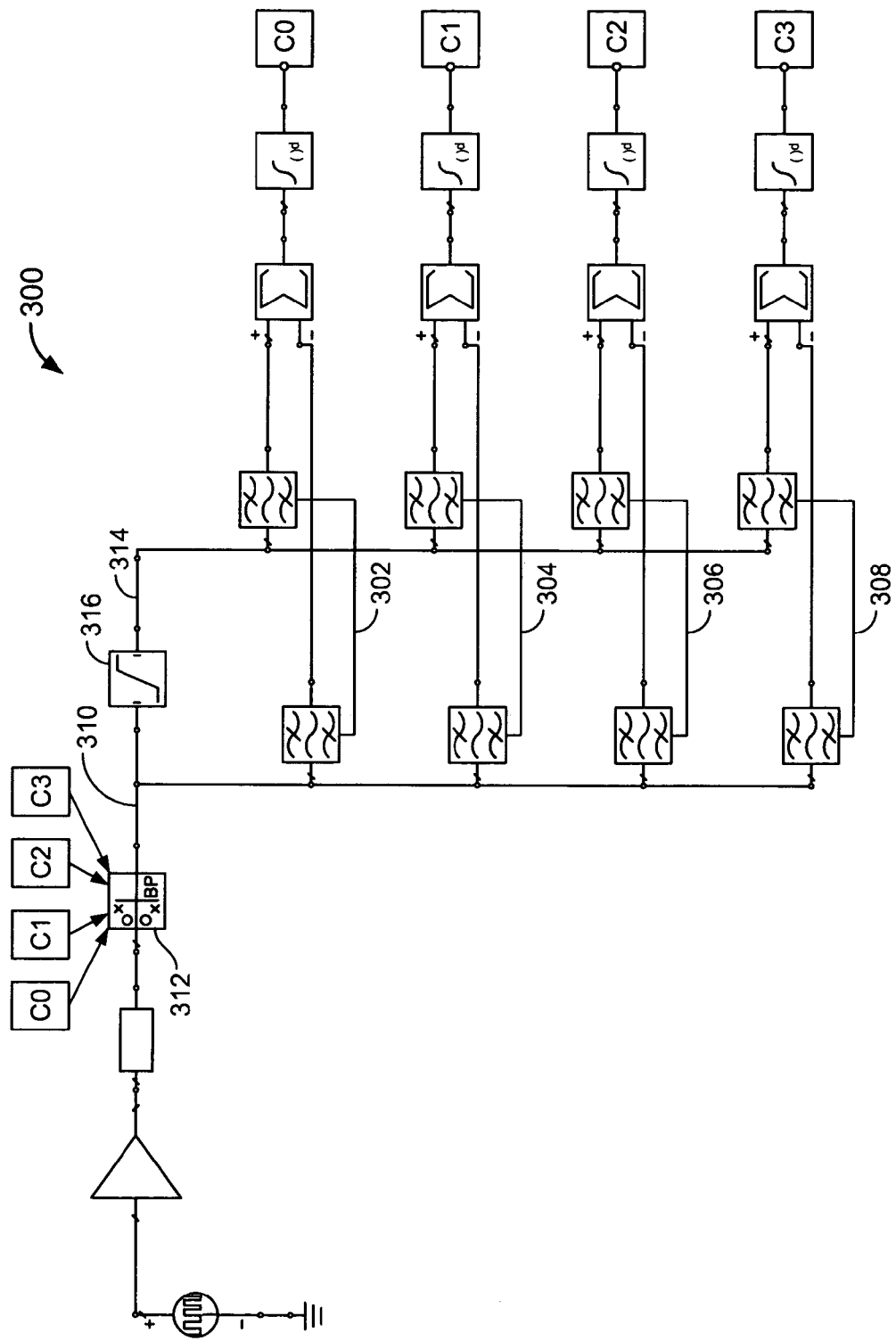
FIG. 3 is a schematic of a frequency domain equalizer system in accordance with an exemplary embodiment of the present invention, wherein the system includes a plurality of summing circuits.

Referring to FIG. 3, an additional exemplary embodiment of a frequency domain equalization system 300 is provided in which the system includes multiple summing circuits, integrators, and band-pass filters. As illustrated in FIG. 3, the frequency domain equalization system 300 is similar to the previously described frequency domain equalization system 300 however the frequency domain equalization system 300 includes multiple pairs of band-pass filters. In an embodiment, each pair of band-pass filters are communicatively coupled to a summing circuit and an integrator. Further, in such embodiment, the multiple pairs of band-pass filters are arranged in parallel. For example, the frequency domain equalization system 300 includes four pairs of band-pass filters, 302, 304, 306, and 308. Each pair of filters includes a first filter for receiving a receiver decision circuit input signal 310 and a receiver decision circuit output signal 314 from a receiver decision circuit 316. The use of multiple pairs of band-pass filters permits the equalization to occur without the need for precise time delays. For example, each pair of filters is set to pass a signal at a different frequency. Thus, this system allows a highly distorted signal to be equalized for the band-pass filters may accommodate a wide-range of frequencies.

Figure 4:
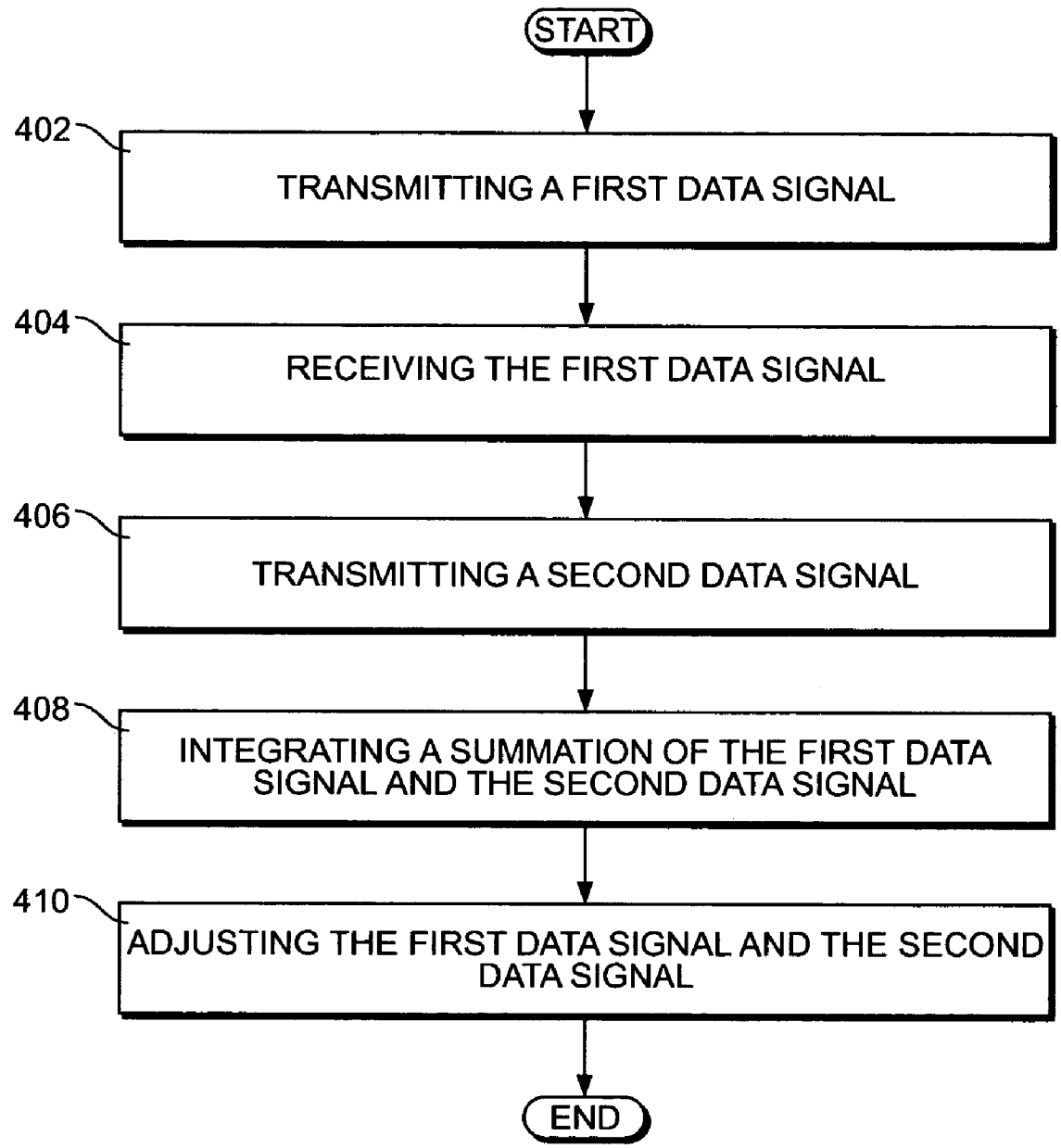
FIG. 4 is a flow chart of a method of equalization in accordance with an exemplary embodiment of the present invention, wherein the method includes use of a frequency domain equalizer.

Referring to FIG. 4, a method 400 for frequency domain equalization using a frequency domain equalizer in a communication system is provided. In an exemplary embodiment, the method 400 for frequency domain equalization includes transmitting a first data signal 402. For example, the first data signal may be transmitted by a transmit driver to a receiver decision circuit and a first band-pass filter. The method 400 may include receiving the first data signal 404 in which the first data signal may be received by the receiver decision circuit. In addition, the method 400 may include transmitting a second data signal. For instance, upon receiving the first data signal, the receiver decision circuit may transmit a second data signal to a second band-pass filter. In an embodiment, the first and the second band-pass filters are Butterworth band-pass filters.

In further exemplary embodiments, the method 400 for frequency domain equalization includes integrating a summation of the first data signal and the second data signal 408. For instance, the summation of the first data signal and the second data signal may be performed by a summing circuit. The integrated summation of the first data signal and the second data signal may be transmitted to an all-pass filter. In an advantageous embodiment, the all-pass filter is a multiple pole/multiple zero all-pass filter.

The method 400 may further include adjusting the first data signal and the second data signal 410. For instance, the first data signal and the second data signal may be adjusted so that the difference between the first data signal and the second data signal is approximately zero. In such instance, the rise time and duty cycle of the transmit driver are approximately equivalent to the rise time and the duty cycle of the receiver decision circuit. In such configuration, the frequency content of the first data signal of the transmit driver before the channel is approximately equivalent to the frequency content of the second data signal receiver decision circuit.

It is to be understood that the number of band-pass filters, summing circuits, and integrators included within the method 500 may vary depending upon the configuration of the signal which is to be equalized. The use of multiple pairs of band-pass filters, summing circuits, and integrators allows the method to be capable of equalizing highly distorted channels. For example, each pair of band-pass filters may be set to pass a signal at a different frequency, thus allowing a wide-range of frequencies to be accommodated.

It is contemplated that the disclosed frequency domain equalizer system may be implemented in both wireless and wired communication systems. Further, frequency domain equalization may be implemented via various methods including monolithic semiconductor implementation and discrete implementation.

It is to be noted that the foregoing described embodiments according to the present invention may be conveniently implemented using conventional general purpose digital computers programmed according to the teachings of the present specification, as may be apparent to those skilled in the computer art. Appropriate software coding may readily be prepared by skilled programmers based on the teachings of the present disclosure, as may be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to any type of conventional floppy disk, optical disk, CD-ROM, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the forgoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A frequency domain equalizer system, comprising:
   a transmit driver;
   a receiver decision circuit communicatively coupled to the transmit driver, the receiver decision circuit having a receiver decision circuit input signal and a receiver decision circuit output signal;
   an all-pass filter communicatively coupled to the transmit driver and the receiver decision circuit, the all-pass filter having an all-pass input signal;
   a first band-pass filter, a second band-pass filter, a third band-pass filter, and a fourth band-pass filter, the first band-pass filter and the third band-pass filter each acting upon the receiver decision circuit input signal and the second and the fourth band-pass filter each acting upon the receiver decision circuit output signal; and
   a first summing circuit and a second summing circuit, the first summing circuit configured for summation of a first band-pass filter output signal and a second band-pass filter output signal, the second summing circuit configured for summation of a third band-pass filter output signal and a fourth band-pass filter output signal,
   wherein the all-pass filter input signal comprises a first integration of a first summation by the first summing circuit and a second integration of a second summation by the second summing circuit, and at least one of a first rise time or a first duty cycle of the transmit driver is approximately equivalent to at least one of a second rise time or a second duty cycle of the receiver decision circuit.

2. A frequency domain equalizer system as claimed in claim 1, wherein the receiver decision circuit input signal and the receiver decision circuit output signal are adjusted so that the difference between the receiver decision circuit input signal and the receiver decision circuit output signal is approximately zero.

3. A frequency domain equalizer system as claimed in claim 1, wherein the all-pass filter is communicatively coupled to the transmit driver via a channel.

4. A frequency domain equalizer system as claimed in claim 1, wherein the all-pass filter is a multiple pole/multiple zero all-pass filter.

5. The frequency domain equalizer system as claimed in claim 1, further comprising an amplifier which amplifies an external signal supplied by the transmit driver.

6. The frequency domain equalizer system as claimed in claim 1, wherein at least one of the first band-pass filter, the second band-pass filter, the third band-pass filter, or the fourth band-pass filter is a Butterworth band-pass filter.

7. The frequency domain equalizer system as claimed in claim 1, wherein the first integration is performed by a first integrator, and the second integration is performed by a second integrator.

8. The frequency domain equalizer system as claimed in claim 1, wherein the first band-pass filter and the second band-pass filter are configured to pass a signal at a frequency that is different than a frequency that the third band-pass filter and the fourth band-pass filter are configured to pass.

9. A method for frequency domain equalization using a frequency domain equalizer in a communication system, comprising:
   transmitting a first data signal by a transmit driver to a receiver decision circuit, a first band-pass filter, and a third band-pass filter;
   receiving the first data signal by the receiver decision circuit;
   transmitting a second data signal from the receiver decision circuit to a second band-pass filter and a fourth band-pass filter;
   integrating a first summation of a first band-pass filter output signal and a second band-pass filter output signal;
   integrating a second summation of a third band-pass filter output signal and a fourth band-pass filter output signal;
   transmitting the integrated first summation and the integrated second summation to an all-pass filter; and
   adjusting the first data signal and the second data signal so that a frequency signal spectrum difference between the first data signal and the second data signal is approximately zero.

10. The method as claimed in claim 9, wherein the first data signal is transmitted to the receiver decision circuit via a channel communicatively coupled to the transmit driver and the receiver decision circuit.

11. The method as claimed in claim 9, wherein the first summation is performed by a first summing circuit, and the second summation is performed by a second summing circuit.

12. The method as claimed in claim 9, wherein the all-pass filter is a multiple pole/multiple zero all-pass filter.

13. The method as claimed in claim 9, wherein at least one of the first band-pass filter, the second band-pass filter, the third band-pass filter, or the fourth band-pass filter is a Butterworth band-pass filter.

14. The method as claimed in claim 9, wherein a rise time and a duty cycle of the transmit driver are approximately equivalent to a rise time and a duty cycle of the receiver decision circuit.

15. The method as claimed in claim 9, further comprising amplifying the first data signal by an amplifier.

16. A frequency domain equalization system, comprising:
   means for transmitting a first data signal to a receiver decision circuit, a first band-pass filter, and a third band-pass filter;
   means for transmitting a second data signal from the receiver decision circuit to a second band-pass filter and a fourth band-pass filter;
   means for integrating a first summation of a first band-pass filter output signal and a second band-pass filter output signal;

means for integrating a second summation of a third band-pass filter output signal and a fourth band-pass filter output signal;

means for adjusting the first data signal and the second data signal so that a frequency signal spectrum difference between the first data signal and the second data signal is approximately zero; and means for transmitting the integrated first summation and the integrated second summation to the means for adjusting the first data signal and the second data signal, wherein at least one of a rise time or a duty cycle of the means for transmitting the first data signal is approximately equivalent to at least one of a rise time or a duty cycle of the receiver decision circuit.

17. The frequency domain equalization system as claimed in claim 16, wherein the means for adjusting the first data signal and the second data signal is an all-pass filter.

18. The frequency domain equalization system as claimed in claim 17, wherein the all-pass filter is a multiple pole/multiple zero all-pass filter.

19. The frequency domain equalization system as claimed in claim 16, wherein at least one of the first band-pass filter, the second band-pass filter, the third band-pass filter, or the fourth band-pass filter is a Butterworth band-pass filter.

* * * * *